Sept. 22, 1964     W. SIEPMANN     3,149,818
ELASTIC WEDGE-SHAPED GATE MEMBER FOR SLIDE STOP
VALVES AND METHOD OF PRODUCING SAME
Filed Feb. 6, 1962     2 Sheets-Sheet 1

INVENTOR
Walter Siepmann by:
Michael S. Striker
Attorney

Sept. 22, 1964            W. SIEPMANN            3,149,818
ELASTIC WEDGE-SHAPED GATE MEMBER FOR SLIDE STOP
VALVES AND METHOD OF PRODUCING SAME INVENTOR
Walter Siepmann
by:
Michael S. Striker
Atty

United States Patent Office 3,149,818
Patented Sept. 22, 1964

3,149,818
ELASTIC WEDGE-SHAPED GATE MEMBER FOR SLIDE STOP VALVES AND METHOD OF PRODUCING SAME
Walter Siepmann, Haus Mohnetal, Belecke (Mohne), Germany, assignor to Stahl-Armaturen Siepmann G.m.b.H., K.G., Belecke (Mohne), Germany, a firm
Filed Feb. 6, 1962, Ser. No. 171,417
Claims priority, application Germany, Feb. 7, 1961, St 17,433
7 Claims. (Cl. 251—327)

This invention relates to gate valves, and more specifically to a wedge-shaped gate member for slide stop valves and to the method of producing same.

Gate valves have become known which have an elastic wedge-shaped gate member that can be lifted and lowered by means of a valve spindle and consists of two preferably forged plates connected together through the intermediary of a pin extending through the centres of the plates.

While such gate members serve their intended purposes within certain inherent limitations, they have several disadvantages with regard to the durability of the connection of the plates.

Many suggestions have been made by the art to eliminate these disadvantages and to provide a satisfactory connection of the plates. One suggestion called for the use of thin solid pins and another one for the use of hollow pins having a larger diameter than the solid pins. In the latter case also connecting the end faces of the hollow pins with the plates by butt welding was suggested. However, none of the suggestions has led to completely satisfactory results. Pressed or preferably forged gate members are required for slide stop valves of the type which will be described later on because pressed or forged gate members have several advantages. Such gate members, however, can be manufactured only in the form of plate-like halves which subsequently have to be connected by welding in order to ensure reliability in operation. Slide stop valves with an elastic wedge-shaped gate member are particularly adapted for use in pipes having a large internal diameter, such as hot-steam pipes or pipes through which a fluid under high pressure is conducted.

It is the object of the invention to provide in these gate members for slide stop valves in an economical manner a particularly sturdy and durable connection between the two plates forming the gate member.

To attain this object, the invention provides an elastic wedge-shaped gate member for slide stop valves, which comprises two initially separate plates, an outwardly bulged central portion defining a cavity in each of said plates, an opening extending through the outwardly bulged central portion of one of said plates, a small annular projection surrounding each cavity, a flat annular surface formed on each annular projection, said plates being arranged in juxtaposition to abut with said flat annular surfaces and reliably connected together by a weld metal insert in at least the hollow space formed by the cavities of the juxtaposed plates, said weld metal insert being in an intimate fusion with the material of the plates surrounding it, and means adapted to be engaged from the outside of the gate member for lifting and lowering the same.

The opening is provided for introducing the weld metal and preferably arranged in the centre of the plate.

The hollow space containing the weld metal insert may be either of spherical or double cone shape. In the latter case, the hollow space may be of greater extent in the plane of the plates than in the direction of the centre axis thereof. In some cases, however, it might be necessary for the weld metal filled hollow space to have its maximum extent in the plane of the axis of the plates. This latter form of construction is to be preferred when the provision of a vertical bore serving as a spindle passage is required, while at the same time a relatively shallow depth of the cavities is maintained. This bore may be dispensed with in cases where the gate member is constructed for suspension from the valve spindle.

A method of producing the aforementioned elastic wedge-shaped gate member as proposed by the invention comprises the steps of so superpositioning in a substantially horizontal position two separate plates having each an outwardly bulged central portion defining a cavity, and a flat annular surface formed on a small annular projection surrounding said cavity, that the flat annular surfaces are in close contact with each other, chucking said superpositioned plates in a holding device so that an opening extending through one of the plates is directed upwardly, filling only the hollow space formed by the cavities with powdered welding flux introduced through said opening, inserting a welding rod as an electrode into said welding flux and subjecting said plates to an electric welding process until the originally hollow space formed by said cavities and the opening in the one plate are completely filled with weld metal.

By this construction and arrangement of the plates of the wedge-shaped gate member, first a hot weld metal bath is obtained under the powdered welding flux and also under the forming slag by the application of high current intensity. The hollow space will gradually fill with weld metal which intimately fuses with the likewise melting wall surrounding the hollow space. The slag floating on the molten weld metal is forced out through the opening by the rising weld metal. The welding process is completed when the hollow space as well as the opening are filled up to the outer rim of the latter with weld metal. At the same time an intimate fusion of the weld metal with the wall of the opening is obtained.

After cooling down, the two plates of the wedge-shaped gate member will be inseparably bonded at their central portions so as to form an integral body. The internal weld connection is highly satisfactory and provides a particular sturdiness not excluding, however, the desired elasticity of the wedge-shaped gate member.

The electroslag welding process is known per se and thus is not the subject matter of the invention. Particular advantages, however, are involved in using this welding process for the manufacture of the specific wedge-shaped gate member, which advantages will contribute to increasing the reliability in operation of the high duty slide stop valves.

Two preferred embodiments of the invention will now be described by way of example nad with reference to the accompanying drawings, in which.

Figure 1:
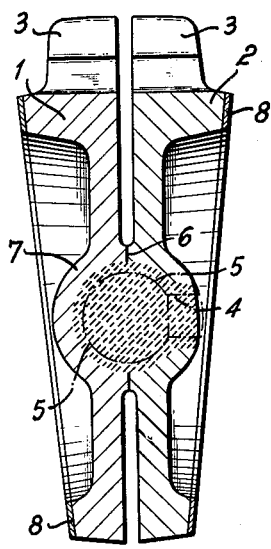
FIG. 1 is a vertical section through a wedge-shaped gate member according to the invention.
Figure 2:
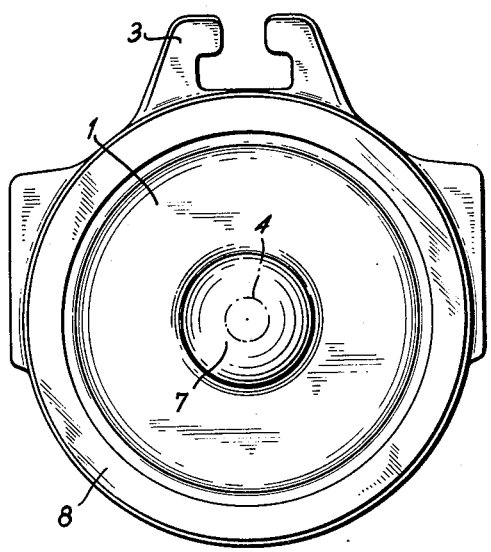
FIG. 2 is a front elevational view thereof.

With reference now to the drawings, FIGS. 1 and 2 show an elastic wedge-shaped gate member of a slide stop valve constructed for suspension from a valve spindle (not shown). The wedge-shaped gate member consists of two initially separate plates 1 and 2 which are provided with hook-type lugs 3 adapted to receive the hammer-head part of the valve spindle.

The plates 1 and 2 are die forged and identical. Directly after the forging operation, an opening 4 is provided preferably in the centre of the plate 2 by punching. On the sides facing each other, each of the plates 1 and 2 is provided with a small annular projection on which a flat annular surface 6 is formed. This small annular projection and this flat annular surface 6 surround a cavity 5 which is defined by an outwardly bulged central portion 7.

For integrally connecting the plates 1 and 2, these are chucked in horizontal position in a holding device so that the opening 4 is directed upwards. Both plates 1 and 2, being forged blanks, are then welded together. Previous or subsequent machining of the place where the welding is effected is not required. First, powdered welding flux is filled into the hollow space formed by the cavities 5 through the opening 4 and then a welding rod is inserted. As the material melts, the hollow space formed by the cavities 5 is filled up with weld metal beneath the forming slag. At the same time, the weld metal intimately fuses with the likewise melting surrounding wall. This connection is absolutely inseparable and reliable in operation, and is located accurately between the outwardly bulged central portions 7 of the two plates 1 and 2. The pressure acts accurately centrally on the seating faces of the valve. The connection requires little space. The two plates 1 and 2 can be connected at a distance apart of but few millimetres. This permits an accordingly smaller spacing of the seating faces and the housing of the slide stop valve can be reduced in size correspondingly.

Figure 3:
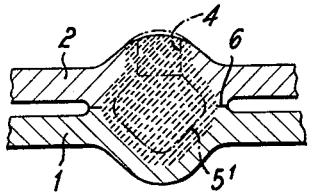
FIG. 3 is a horizontal section through part of the wedge-shaped gate member, showing a modified construction thereof.
Figure 4:
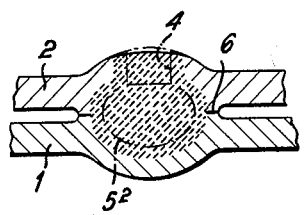
FIG. 4 is a similar view showing a further modification thereof.

Whereas FIGS. 1 and 2 show conjoint or correlative cavities 5 to form a spherical hollow space, further convenient shapes of correlative cavities $5^1$ and $5^2$ are represented in FIGS. 3 and 4, respectively. According to FIG. 3, the conjoint cavities $5^1$ may be shaped in the form of a double-cone having outwardly directed vertices. The conjoint cavities $5^2$ as shown in FIG. 4 have the form of a horizontal ellipsoid. Thus, the diameter of this hollow space as measured in the direction of the plane of the plates 1 and 2 is greater than the length of the cavities in the axial direction of the plates 1 and 2. This results in a favourable distribution of the weld metal in the direction of the plane of the plates 1 and 2. However, in each specific case the shape of the conjoint cavities should be selected to be such that the slag floating on the weld metal is allowed to flow out through the opening 4 so as to ensure a clean weld connection.

After the roughly forged plates 1 and 2 have been welded together, seating faces 8 are provided thereon, for example by welding, and subsequently machined.

Figure 5:
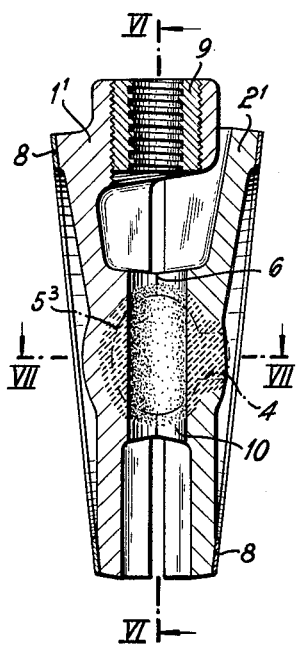
FIG. 5 is a vertical section through a wedge-shaped gate member according to a second preferred embodiment of the invention.
Figure 6:
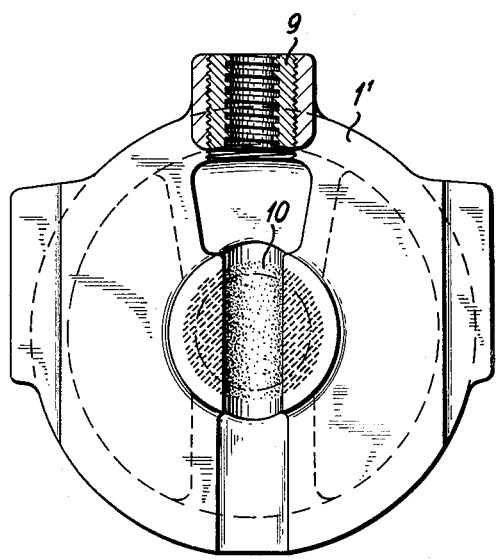
FIG. 6 is a vertical cross-section through the wedge-shaped gate member on the line VI—VI of FIG. 5.
Figure 7:
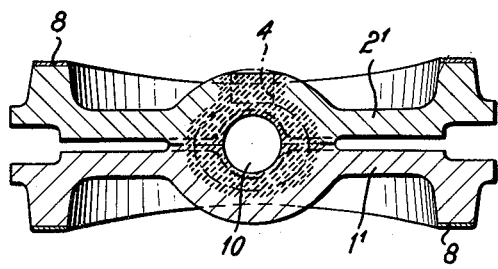
FIG. 7 is a horizontal section through the wedge-shaped gate member on the line VII—VII of FIG. 5.

FIGS. 5 to 7 show a modified embodiment of a wedge-shaped gate member which has an internal screw thread for co-operation with the valve spindle. In this slide stop valve, the valve spindle is screwed into the interior of the wedge-shaped gate member when the latter is lifted. Therefore, its plates $1^1$ and $2^1$ are dissimilar in shape, the plate $1^1$ being provided with a spindle nut 9. The other plate $2^1$ has a corresponding recess in the region of the spindle nut 9. To provide a passage for the lower end of the valve spindle not shown, a bore 10 extends vertically through the weld connection.

The connection of the two plates $1^1$ and $2^1$ is effected in the same manner as described with reference to the first embodiment shown in FIGS. 1 and 2. After the weld metal which, for example, is introduced into the correlative cavities 5 according to the electroslag welding method, has cooled down, the connection thus produced is provided with the vertical bore 10 which serves as a valve spindle passage.

In this case, the hollow space formed by the cavities $5^3$ in the two plates $1^1$ and $2^1$ and which is to be filled with the weld metal, is expediently in the form of an ellipsoid having its maximum extent in the plane of the plates $1^1$ and $2^1$. This shape allows a sufficient amount of welding material to be provided in the plane of the plates 1 and 2 at either side of the vertical bore 10 so that, after the latter has been provided, a reliable connection is ensured between the two plates $1^1$ and $2^1$. Due to the advantageous connection, this wedge-shaped gate member, too, can be of smaller dimension than prior art constructions serving the same purpose.

I claim:

1. An elastic wedge-shaped gate member for slide stop valves comprising two initially separate plates, an outwardly bulged central portion defining a cavity in each of said plates, an opening extending through the outwardly bulged central portion of one of said plates, a small annular projection surrounding each cavity, a flat annular surface formed on each annular projection, said plates being arranged in juxtaposition to abut with said flat annular surfaces and reliably connected together by a weld metal insert in at least the hollow space formed by the cavities of the juxtaposed plates, said weld metal insert being in an intimate fusion with the material of the plates surrounding it, and means adapted to be engaged from the outside of the gate member for lifting and lowering the same.

2. An elastic wedge-shaped gate member as claimed in claim 1, wherein the opening extends through the centre of the plate and contains a weld metal insert up to its outer rim.

3. An elastic wedge-shaped gate member as claimed in claim 1, wherein the hollow space formed by the cavities of the juxtaposed plates and containing the weld metal insert is of spherical shape.

4. An elastic wedge-shaped gate member as claimed in claim 1, wherein the hollow space formed by the cavities of the juxtaposed plates and containing the weld metal insert is of double cone shape.

5. An elastic wedge-shaped gate member as claimed in claim 1, wherein the hollow space formed by the cavities of the juxtaposed plates and containing the weld metal insert is of greater extent in the plane of the plates than in the direction of the centre axis thereof.

6. An elastic wedge-shaped gate member as claimed in claim 1, wherein a bore is provided in the weld metal insert, said bore extending in the direction of the longitudinal axis of the valve spindle and serving as a passage for said valve spindle, the connection between the plates being ensured at either side of the bore by the marginal regions of the weld metal insert and the intimate fusion thereof with the material of the surrounding wall of the cavities.

7. A method of producing an elastic wedge-shaped gate member for slide stop valves comprising the steps of so superpositioning in a substantially horizontal position two separate plates having each an outwardly budged central portion defining a cavity, and a flat annular surface formed on a small annular projection surrounding said cavity, that the flat annular surfaces are in close contact with each other, chucking said superpositioned plates in a holding device so that an opening extending through one of the plates is directed upwardly, filling only the hollow space formed by the cavities with powdered welding flux introduced through said opening, inserting a welding rod as an electrode into said welding flux and subjecting said plates to an electric welding process until the originally hollow space formed by said cavities and the opening in the one plate are completely filled with weld metal.

References Cited in the file of this patent

UNITED STATES PATENTS

| | | |
|---|---|---|
| 2,565,475 | Cox | Aug. 28, 1951 |
| 2,656,143 | Fantz | Oct. 20, 1953 |
| 2,677,876 | Juhnke | May 11, 1954 |
| 2,834,097 | Eichenberg | May 13, 1958 |